Patented Feb. 1, 1949

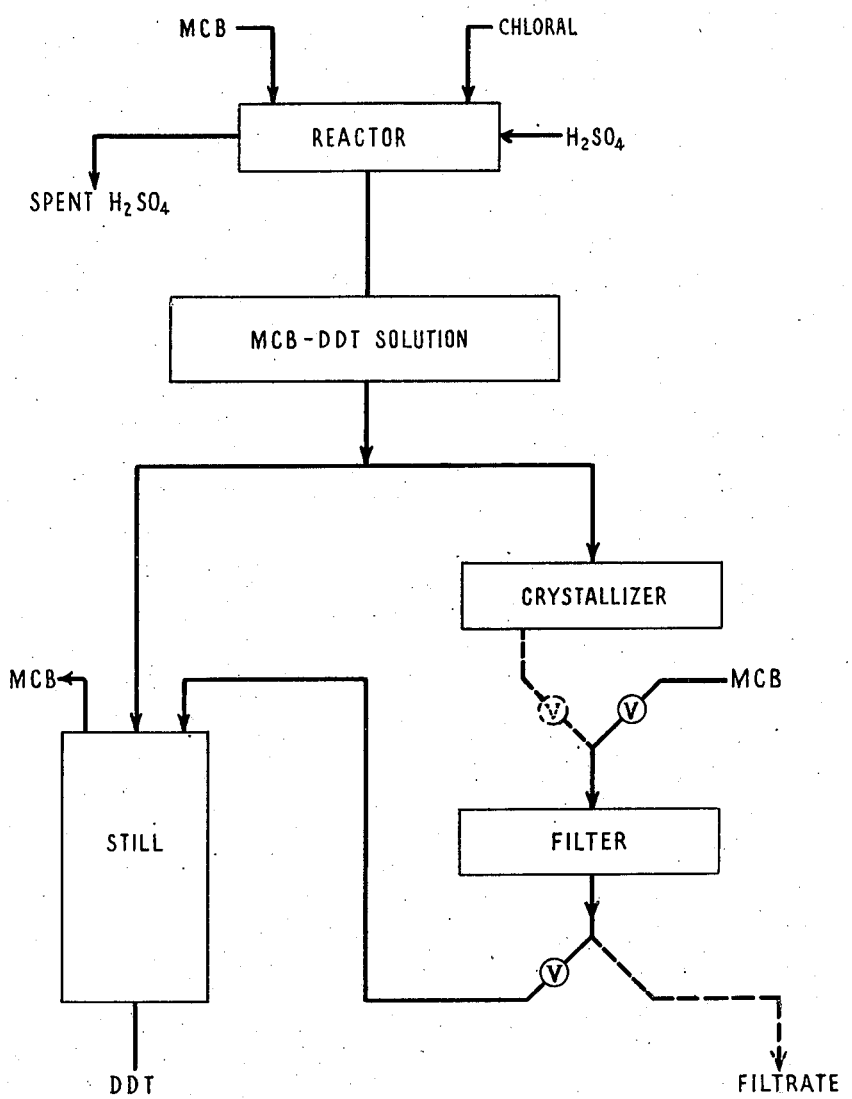

2,460,535

UNITED STATES PATENT OFFICE 2,460,535

MANUFACTURE OF TRICHLOROMETHYL DIARYL METHANES

John W. Robinson, Brecksville, Ohio, assignor to E. I. du Pont de Nemours & Company, Wilmington, Del., a corporation of Delaware Application February 21, 1945, Serial No. 579,107

6 Claims. (Cl. 260—649)

This invention relates to the manufacture of trichloromethyl diaryl methanes and is particularly directed to processes for effecting condensation of chloral-yielding compounds and liquid aromatic compounds having replaceable ortho and para hydrogen in the presence of sulfuric acid.

It has recently been discovered that the trichloromethyl diaryl methane compounds are effective for the control of certain insect pests and of consequence the manufacture of these compounds, especially the product obtained from monochlorobenzene, commonly called DDT, has become of considerable interest.

It is an object of the invention to provide improved processes for the manufacture of these compounds. Other objects of the invention are to avoid certain difficulties of the prior art, as will be pointed out, and to obtain certain advantages as will become apparent. Further objects will appear as the description proceeds.

It is known that when chloral is condensed with an aromatic compound having replaceable hydrogen by means of sulfuric acid there is obtained a product of the trichloromethyl diaryl methane type. Ber., 5, 1098; Ber., 7, 1181; U. S. 1,707,181; and U. S. 2,329,074. By condensing chloral and monochlorobenzene there is obtained a product called DDT which is made up largely of 2,2-bis(p-chlorophenyl)-1,1,1-trichloroethane and a smaller quantity (about one-half as much) of the corresponding ortho,para compound. A product, commonly known as DDT, which is not the pure compound but is a mixture consisting largely (60–65%) of the para,para-isomer [2,2-bis(p-chlorophenyl)-1,1,1-trichloroethane] melting at 107–108° C., with the remainder (35–40%) made up largely of the ortho,para-isomer melting at 72–74° C. with up to about 10% or so of other by-products. Similar mixtures of isomers are obtained with other aromatic compounds having replaceable ortho and para hydrogen. It is an object of the invention to provide processes for producing DDT having a proportion of the para,para-isomer greater than obtainable in the crude product.

The mixtures of isomers obtained in such a condensation have no sharp melting point and are usually of such a wide range that melting point determinations are extremely difficult and in general unsatisfactory. Reproducible results which give a fairly accurate indication of the quality of the crude may be obtained, however, by determining the setting point by the cooling curve method. As the setting point is considered an index of the quantity of para,para-isomer it is, stated another way, an object of the invention to provide ways and means of improving the setting point.

It is known, according to U. S. Patent 2,329,074 and British Patents 547,871 and 547,874, that a relatively pure product having a melting point of 103–105° C. may be obtained by recrystallizing the crude product from alcohol. This process is not particularly desirable, especially in processes where the crude product is contaminated with an excess of the aromatic compound. It is an object of the invention to provide processes for recrystallizing the product which are particularly applicable when the product is prepared in admixture with an excess of the aromatic compound.

These objects are accomplished in the present invention, a typical embodiment of which is illustrated in the accompanying flowsheet.

According to the invention, as illustrated in the flowsheet, monochlorobenzene and chloral-yielding compounds such as chloral hydrate or chloral alcoholate are reacted in a suitable reactor in the presence of sulfuric acid of sufficient strength to take up the water liberated in the reaction and the spent sulfuric acid is separated from the reaction product. Sufficient monochlorobenzene is added either during the reaction or subsequent thereto to dissolve the reaction product so that the product can be recovered from the spent sulfuric acid by gravity separation. The monochlorobenzene solution of the product, after washing to remove water soluble products, is divided into two parts. One part is sent to the still in which the monochlorobenzene is recovered by distillation and the other part is sent to a crystallizer where it is cooled, and concentrated if necessary, until crystals of the para,para-isomer separate. The crystal slurry is then withdrawn to a filter or centrifuge where the purified product is separated from the filtrate. The purified product, which still is contaminated with monochlorobenzene, is then transferred to the still suitably by dissolving it in monochlorobenzene where it is treated, suitably along with the first portion of the monochlorobenzene-product solution, to recover the monochlorobenzene and to obtain the product free of contamination with monochlorobenzene.

By operating in this manner it is possible to obtain a product of almost any set point desired simply by adjusting the relative proportions of monochlorobenzene solution fed to the crystallizer and to the still. Thus it is possible to obtain a product having a setting point ranging from that of the crude, which is variable according to how the crude is prepared, up to as high as about 106° C. By effecting crystallization in monochlorobenzene, the aromatic compound used in producing the crude product, there is avoided the necessity of separating the excess of monochlorobenzene from the product before effecting crystallization. Also there is avoided the necessity of removing the crystallizing solvent from the crystals in an independent operation. The crystals while still contaminated with monochlorobenzene from the filteration may be transferred directly to the still without complicating the recovery of monochlorobenzene. Furthermore, the processes of the invention have the advantage that the filtered crystals may be dissolved in a further quantity of monochlorobenzene to facilitate transfer to the still without complicating the recovery of monochlorobenzene or necessitating the complete removal of mother liquor from the crystals. In these and other respects the processes of the invention offer new and unexpected advantages over the processes available to the prior art.

In effecting crystallization from monochlorobenzene solution it has been found desirable, if a large crop of crystals is wanted within a reasonable time, to hold the supersaturated solution in the vicinity of the saturation temperature until crystals of the para,para-isomer separate before lowering the temperature. The monochlorobenzene solutions of DDT have been observed to have a strong tendency to undercool and that when once undercooled crystallization initiated either by agitation, seeding or any other means proceeds rapidly and uncontrollably producing a finely divided crystalline mass which is difficult to agitate and filter. Thus it is desirable to hold the temperature to within 10 to 15 degrees of the saturation temperature until substantial crystallization has taken place and then gradually to reduce the temperature by application of brine or other cooling medium to the crystallizer until a satisfactory crop of para-para crystals is obtained. The time during which the solution is held in the vicinity of the saturation temperature may be shortened by seeding with crystals of the para,para-isomer. To effect this, a certain portion, say, 10 to 20%, of the crystal slurry of one operation is held over as a heel for the next crystallization. The fresh solution and the crystal heel are brought together while maintaining a temperature just below the saturation temperature and the crystal slurry thus formed is gradually cooled. Mild agitation is desirable during the crystallization. By this procedure there is obtained a large crop of large crystals which are easily separated from the mother liquor whereas with the ordinary cooling of the solution, with or without seeding, the crystals are fine and difficult to agitate and to filter.

The invention may be more fully understood by reference to the following example in which the parts are by weight unless otherwise specified:

*Example 1*

A monochlorobenzene solution, containing in the neighborhood of 35% monochlorobenzene and the balance DDT having a set point of 87.1° C., was allowed to stand at room temperature for 75 hours. The crystals thus obtained were filtered off by means of a vacuum filter. 2118 parts of crystal was obtained from 4377 parts of solution. After drying overnight on a hot plate there was obtained 1945 parts of crystals having a set point of 102.8° C.

558 parts of the crystals thus obtained was added to 3680 parts of another lot of monochlorobenzene solution containing about the same proportion of monochlorobenzene and the balance DDT having a set point of 87.4° C. After removal of the chlorobenzene there was obtained 2770 parts of DDT having a set point of 91.2° C.

The concentration of the monochlorobenzene solution used in this example was determined by the minimum quantity of monochlorobenzene required to maintain the product of condensation fluid at the temperature of the reaction which was considerably above room temperature and in the neighborhood of 50–60° C. On cooling to room temperature, therefore, the monochlorobenzene solution was greatly undercooled and a long time was required to initiate crystallization, and the crystals obtained were small and difficult to filter.

Substantial improvement may be obtained by holding the temperature just below the saturation temperature within about 10 or 15 degrees until substantial crystallization has taken place, followed by cooling, preferably slowly, to room temperature or below. In view of the difficulty of undercooling, the saturation temperature may be difficult to determine but for solutions of the concentration of this example, it is in the neighborhood of 40° C.

A particularly effective method of carrying out the process whereby large crystals and high yields are obtained is illustrated in the following example.

*Example 2*

Into a jacketed vessel through which a cooling fluid may be circulated to control temperature of the contents there is charged 30.3 parts of crystal slurry containing 10 parts of monochlorobenzene and the balance crude DDT. With mild agitation there is then run into the vessel 178.7 parts of a 65% monochlorobenzene solution of DDT obtained from the condensation of chloral with monochlorobenzene in the presence of sulfuric acid at a temperature of 55–60° C. The monochlorobenzene solution is added at a uniform rate of about 2 to 3 lb. per minute and the temperature in the vessel is maintained at 40° C. When all the solution is added, the batch is cooled slowly at a rate of about 7 or 8° C. per hour until a temperature of 5° C. is reached, or until the slurry becomes too thick for good agitation. This temperature is held for about 30 minutes. About 30 lb. of this slurry is reserved for a second crystallization and the balance is withdrawn to a nutsche vacuum filter where it is sucked as dry as practical. About 85 to 90 lb. of crystals is obtained. This is taken up in hot monochlorobenzene and the solution transferred to a vacuum still where it is mixed with appropriate quantity of a monochlorobenzene solution of crude DDT to give a material of the desired set point. The crystals from the nutsche filter may also be treated separately to give a product of maximum set point.

The mother liquor may be concentrated and a second crop of crystals taken.

While I have disclosed my invention with reference to a particular example, it will be understood that it is not limited to the particular details thereof but that variations may be made therein without departing from the spirit and scope of the invention.

While I have illustrated my invention with reference to highly concentrated monochlorobenzene solutions and while the advantages of the invention are most fully realized with the highly concentrated solutions, it will be understood that less concentrated solutions may be employed. It is generally desirable, however, and the advantages of the invention are as fully realized when the concentration of the monochlorobenzene solution is above about 60%, that is to say, the monochlorobenzene constitutes less than about 40% and the condensation product the balance.

The process is also applicable to the manufacture of products other than DDT. For example, in place of monochlorobenzene there may be substituted other liquid aromatic compounds having replaceable ortho and para hydrogen, such as bromobenzene, methoxybenzene, phenetol, phenol, toluene, ethylbenzene, and like homologues and derivatives of benzene which give crystallizable mixtures of isomers. The invention is particularly applicable to benzene and its mono-substituted compounds in which the substituent directs to the ortho or para positions, as, for example, chlorine, bromine, iodine, fluorine, methyl, ethyl, and other alkyl groups; hydroxy, ethoxy, methoxy, and other alkoxy groups. Such aromatic compounds as are liquid under the conditions of temperature involved and have replaceable ortho and para hydrogens so that when reacted with chloral will give mixtures of isomers may be utilized in crystallizing the condensation product in accordance with the methods and principles herein set forth.

I claim:

1. In a process for the manufacture of the product trichloromethyl diaryl methanes by the condensation of a chloral-yielding compound with an aromatic compound having replaceable ortho and para hydrogen in the presence of sulfuric acid in which said product is recovered in solution in said aromatic compound, the steps of dividing the solution of the product in the aromatic compound into two fractions, crystallizing product from one of said fractions, separating the crystals from the mother liquor, introducing the crystals into the remaining fraction, and then treating the resulting fraction to recover the product of the condensation free of the aromatic compound.

2. In a process for the manufacture of DDT by the condensation of a chloral-yielding compound with monochlorobenzene in the presence of sulfuric acid in which crude DDT is recovered in monochlorobenzene solution, the steps of dividing said solution of crude DDT in monochlorobenzene into two fractions, crystallizing DDT from one of said fractions, separating the crystals from the mother liquor, introducing the crystals into the remaining fraction, and treating the remaining fraction to remove monochlorobenzene.

3. In a process for the manufacture of DDT by the condensation of a chloral-yielding compound with monochlorobenzene in the presence of sulfuric acid in which crude DDT is recovered in a monochlorobenzene solution, the steps of subjecting at least a portion of the monochlorobenzene solution of the crude DDT to crystallization, separating off the crystals, incorporating the crystals in a further quantity of monochlorobenzene solution of DDT, and then distilling off the monochlorobenzene.

4. In a process for the manufacture of DDT by the condensation of a chloral-yielding compound with monochlorobenzene in the presence of sulfuric acid in which crude DDT is recovered in a monochlorobenzene solution, the steps of subjecting at least a portion of said monochlorobenzene solution consisting of less than about 40% monochlorobenzene and the balance the condensation product to crystallization, separating off the crystals, incorporating the crystals in a solution of crude DDT in monochlorobenzene and distilling off the monochlorobenzene to recover DDT.

5. In a process for the manufacture of DDT by the condensation of a chloral-yielding compound with monochlorobenzene in the presence of sulfuric acid in which the condensation product is recovered in a monochlorobenzene solution, the steps of subjecting the monochlorobenzene solution consisting of less than about 40% monochlorobenzene and the balance the product of the condensation to crystallization while maintaining a temperature within about 15° C. of the saturation temperature until there is a substantial quantity of crystals in the liquor, gradually cooling the liquor and separating off the crystals, dissolving the crystals in monochlorobenzene and introducing the solution thus obtained into the product of the condensation in solution in monochlorobenzene and distilling off the monochlorobenzene to recover the product.

6. In a process for the manufacture of DDT by the condensation of monochlorobenzene with a chloral-yielding compound in the presence of sulfuric acid in which the DDT is recovered in a monochlorobenzene solution, the steps of dividing the solution of DDT in monochlorobenzene into two fractions, each fraction being a substantial portion of the whole solution, crystallizing DDT from one of said fractions, separating the crystals from the mother liquor, combining the crystals with the other fraction, and removing monochlorobenzene from the resulting combination.

JOHN W. ROBINSON.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

Fieser: "Experiments in Organic Chemistry," pages 33–4 (1935).

Callaham: "Chemical and Metallurgical Engineering," vol. 51, page 114 (1944).

Brand: "Ber. der deut. chem. Gesell.," vol. 72, page 1031 (1939).